United States Patent [19]

Custard

[11] 4,158,929

[45] Jun. 26, 1979

[54] ANIMAL TRAP DEVICE

[76] Inventor: Paul Custard, R.D., Port Matilda, Pa. 16870

[21] Appl. No.: 861,846

[22] Filed: Dec. 19, 1977

[51] Int. Cl.² ............................................. A01M 23/00
[52] U.S. Cl. ............................................ 43/58; 43/61; 43/82
[58] Field of Search .................. 43/58, 61, 65, 80, 81, 43/82, 83

[56] References Cited

U.S. PATENT DOCUMENTS

| | | | |
|---|---|---|---|
| 774,628 | 11/1904 | Wilkinson | 43/82 |
| 1,216,918 | 2/1917 | Armbruster | 43/61 |
| 1,590,879 | 6/1926 | Boynton | 43/61 |
| 1,996,872 | 4/1935 | Long | 43/61 |
| 2,581,327 | 1/1952 | Knox | 43/82 |
| 2,683,951 | 7/1954 | Hamaker | 43/80 X |

*Primary Examiner*—Nicholas P. Godici
*Attorney, Agent, or Firm*—Thomas E. Sterling

[57] ABSTRACT

This invention relates to animal traps and in particular single jaw traps which will prevent the caught animal from self injury to its leg.

There have been many varieties of animal traps. The most common spring-type traps, upon being tripped will clutch the animal's paw in a strong vice-like grip having the full force of the spring behind it. This type of trap often injures the animal's leg and it causes extreme pain to the trapped beast. Very frequently the trapped animal will gnaw off its own leg in an effort to free itself from the trap, thus resulting in a maimed animal and an inhumane trapping device.

11 Claims, 8 Drawing Figures

ANIMAL TRAP DEVICE

BACKGROUND OF THE INVENTION

This invention sets forth an animal trap which will hold and encase the trapped animal's leg, thus preventing the animal from biting its own leg off. A feature of this trap is that the clutching or holding action is developed by the animal's pulling away from the trap and not upon the force of the spring. Another feature of this invention is that the trap is adapted for use on a particular animal, a raccoon, and will prevent and exclude the trapping of dogs.

Two variations of the present invention are set forth in this application. The first, called a "Single Jaw Dog Proof Coon Trap" is intended primarily to trap raccoon or other small animals that have the capability of grasping objects with their paw. The trap requires that the animal reach into a smaller outer shell to grasp the bait therein. This trap will not trap dogs or other non paw-grasping animals. The second variation of trap called the "Single Jaw Dirt Hole Fox Trap" is larger and designed to be partially buried in the ground while it is set. This trap will hold fox, dogs, and larger animals.

An object of this invention is to provide a single jaw animal trap that will prevent the trapped animal from chewing its own leg off.

Another object of this invention is to provide a trap whose holding force is dependent on the animal wedging its own leg.

Still another object of this invention is to provide an animal trap having relatively small spring pressure against the animal's leg.

Yet another object of this invention is to provide a simple, easily constructed animal trap.

Still another object of this invention is to provide a trap which will selectively trap raccoons and reject dogs.

Figure 1:
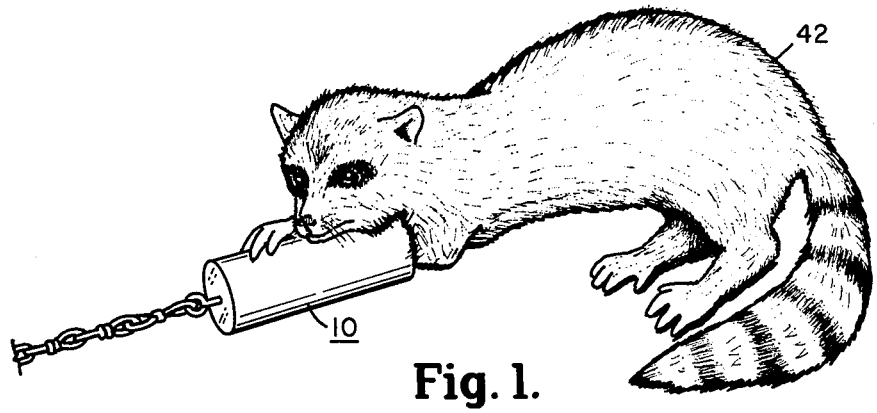
FIG. 1, is a perspective view of the trap of the present invention showing a raccoon with its front leg trapped.
Figure 2:
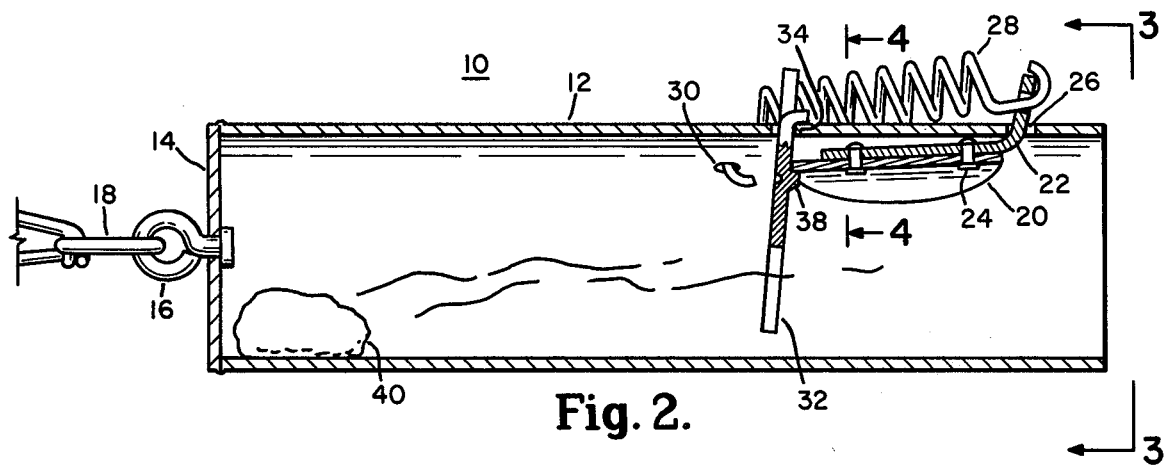
FIG. 2, is a lateral cross-sectional view of this invention taken along the median line of the trap showing the trap in the set position.
Figure 3:
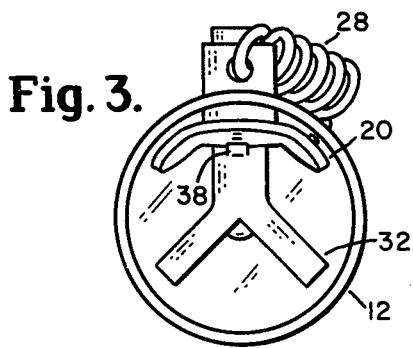
FIG. 3, is a view taken along line 3—3 of FIG. 2.
Figure 4:
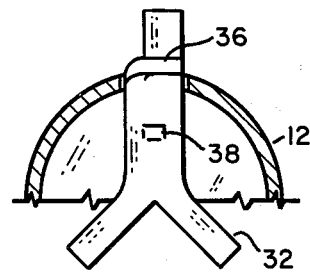
FIG. 4, is a view taken along line 4—4 of FIG. 2.
Figure 5:
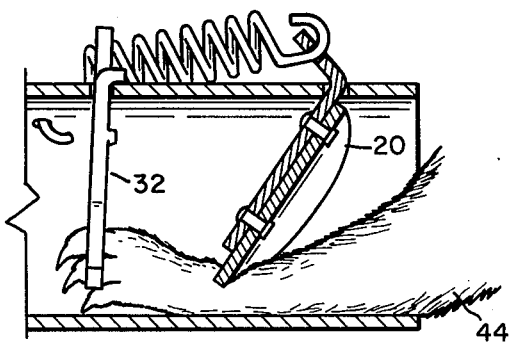
FIG. 5, is a cross-sectional lateral view of the trap in sprung position showing an animal's leg trapped therein.

Referring to the drawings, there is seen the single jaw dog proof coon trap 10 having cylindrical outer shell 12 with a bottom plate 14 sealing one end portion thereof. A swivel 16 extends through a hole in bottom plate 14 so that swivel 16 is rotable. Swivel 16 is attached to chain 18 which is used to secure the trap to a fixed object.

A circular trap jaw 20 is riveted to an L-shaped spring plate 22 by means of rivets 24. A portion of spring plate 22 extends through a jaw slot 26 in outer shell 12 and is positioned so that spring plate 22 will rotate trap jaw 20 within outer shell 12. A spring 28 is hooked upon the portion of spring plate 22 outside of outer shell 12. The other end portion of spring 28 passes through spring hole 30 in outer shell 12. Spring 28 is biased so as to cause spring plate 22 and trap jaw 20 to rotate to a closed position within outer shell 12. Trap jaw 20 is generally a circular shape, having its lateral portions bent downwardly so that it conforms to the cylindrical shape of outer shell 12 when the trap is in its "set" position. A trigger 32 having a V-shaped end portion thereon is positioned within outer shell 12, the end portion of which extends through trigger slot 34 in the upper portion of outer shell 12. Trigger 32 is so positioned that the V-shaped end portion extends within outer shell 12, and trigger 32 rotates about trigger slot 34. A protrusion 36 is integrally attached to the portion of trigger 32 outside of outer shell 12 to prevent the trigger 32 from slipping through trigger slot 34. A catch 38 is positioned on the upper portion of trigger 32 within outer shell 12 and is adapted to engage the bottom portion of trap jaw 20 when the trap 10 is in the "set" position.

In operation, trap jaw 20 is pressed inwardly causing spring plate 22 to rotate within spring hole 30 against the biasing effect of spring 28. Trigger 32 is then moved forward until catch 38 on trigger 32 engages the bottom portion of trap jaw 20. In this position, trap jaw 20 is held in the upper interior portion of outer shell 12 by catch 38. Bait 40 is then placed in the interior of outer shell 12 against bottom plate 14. Chain 18 is then secured to a fixed object thus anchoring trap 10 in place.

Raccoon 40 then approaches trap 10 and smelling bait 40 thrusts his leg 44 within outer shell 12. Leg 44 presses on trigger 32, forcing it to rotate inwardly within trigger slot 34. Catch 38 then releases trap jaw 20 which is pulled by spring 28 to rotate within jaw slot 26 until trap jaw 20 strikes the raccoon's leg 44. When the raccoon 42 attempts to withdraw his leg 44 from the trap 10, trap jaw 20 wedges leg 44 against the interior portion of outer shell 12, thus trapping leg 44. The more raccoon 42 pulls, the tighter trap jaw 20 will clamp leg 44 in position.

As may be seen, leg 44 is completely encased within outer shell 12, hence raccoon 42 cannot reach leg 44 to bite or gnaw it off. Raccoon 42 is thus held securely, humanely, and safely in position until the trap 10 is released. This version of trap 10 is specifically for raccoons, since this type of animal will attempt to reach into holes with its paw and withdraw objects from them. The size of cylindrical outer shell 12 is approximately 2½" in diameter, a size too small to allow dogs to insert their legs.

Figure 6:
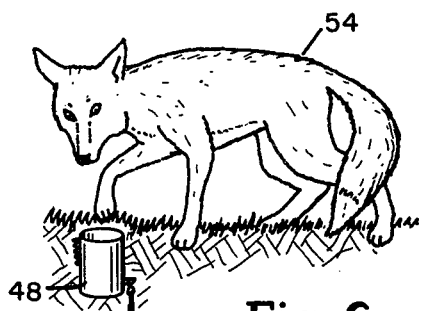
FIG. 6, is a perspective view of a modification of this invention showing a fox about to step into the trap.
Figure 7:
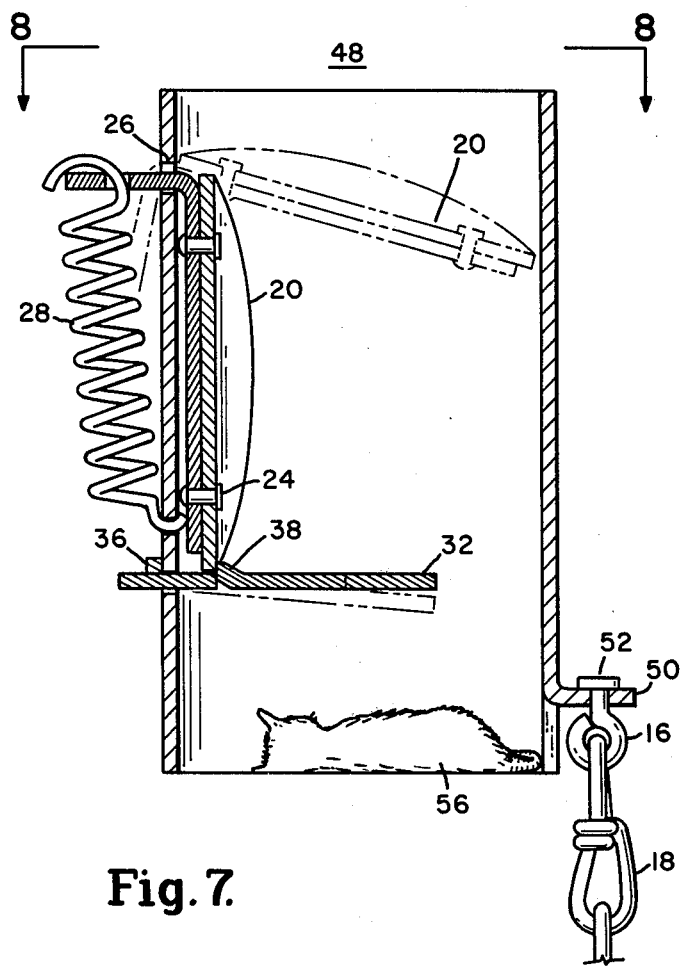
FIG. 7, is a lateral cross-sectional view of the modification of this invention.
Figure 8:
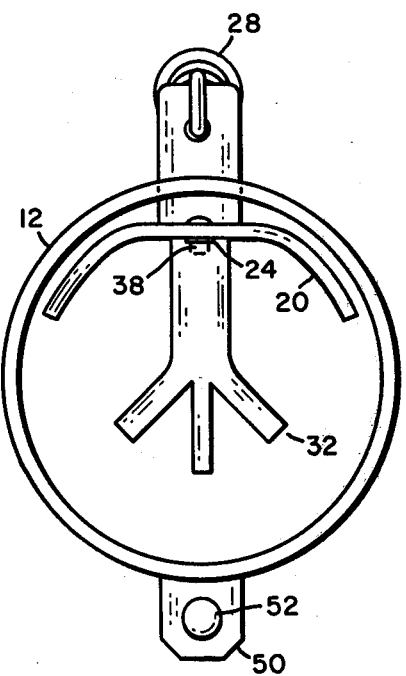
FIG. 8, is a view taken along line 7—7 of FIG. 6.

A modification of the invention may be seen in FIGS. 6, 7 and 8 which has been named the "Single Jaw Dirt Hole Fox Trap" 48. This modification is substantially identical to that already described, except that the cylindrical outer shell 12 has a larger diameter of about 3½" and has no bottom plate 14 attached thereto. In this modification a portion of cylindrical outer shell 12 has been bent at approximately a 90° angle to form swivel attachment 50 through which swivel 16 passes. Swivel attachment 50 has a flange 52 which bears against swivel attachment 50 and may freely rotate, thus preventing chain 18 from becoming entangled. In operation, fox trap 48 is set as previously described and buried in the ground in an upright position. Bait is placed at the bottom of the trap and chain 18 secured to a solid object. Fox 54 approaches the trap 48, smelling the bait 56. The fox inserts his leg within cylindrical outer shell 12 to press against trigger 32 causing catch 38 to release trap jaw 20. Spring 28 will then force trap jaw 20 to rotate in jaw slot 26 until trap jaw 20 presses fox 54's leg (not shown) against the inner surface of outer shell 12. Fox 54 is then securely held as previously described.

I claim:

1. A trap adapted to engage an animal's leg, comprising in combination:

a tubular shell having an entrance opening therein;

a trapping means pivotally attached to the upper portion of said shell and when in contact with the lower portion of said shell is at an inwardly disposed acute angle from said entrance opening, said trapping means pivoting inwardly from said entrance opening;

a spring biased between said trapping means and said shell pivoting said trapping means outwardly toward said entrance opening;

an inwardly pivoting trigger attached to said shell rotating inwardly from said entrance opening;

a trigger catch attached to said trigger and engagable with said trapping means;

securing means attached to said shell.

2. The combination as claimed in claim 1, in which said trapping means is positioned within said shell at a distance from said entrance opening sufficient to enclose a substantial portion of a trapped animal's leg.

3. The combination as claimed in claim 2, in which said trapping means extends through said shell and is pivoted thereon.

4. The combination as claimed in claim 3, in which said trigger extends through said shell and is pivoted thereon.

5. The combination as claimed in claim 4, in which said spring is positioned outside of said shell and is attached thereto.

6. The combination as claimed in claim 5, in which said securing means is comprised of, in combination:

a rotable swivel and a chain attached to said rotable swivel.

7. The combination as claimed in claim 6, in which said trapping means is partially cylindrical in shape.

8. The combination as claimed in claim 7, in which said shell is comprised of a cylinder.

9. The combination as claimed in claim 8, in which said shell has a closed end portion thereon opposite the said entrance opening.

10. The combination as claimed in claim 8, in which said shell has open end portions thereon.

11. The combination as claimed in claim 10, in which said trigger is trifuracted and positioned in a substantially horizontal position.

* * * * *